(12) United States Patent
Pursifull et al.

(10) Patent No.: US 10,393,036 B2
(45) Date of Patent: Aug. 27, 2019

(54) METHODS AND SYSTEM FOR OPERATING AN ENGINE

(71) Applicant: Ford Global Technologies, LLC, Dearborn, MI (US)

(72) Inventors: Ross Dykstra Pursifull, Dearborn, MI (US); Ralph Wayne Cunningham, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 61 days.

(21) Appl. No.: 15/220,071

(22) Filed: Jul. 26, 2016

(65) Prior Publication Data

US 2018/0030908 A1    Feb. 1, 2018

(51) Int. Cl.
| | |
|---|---|
| *F02D 35/00* | (2006.01) |
| *B60W 10/06* | (2006.01) |
| *B60W 10/08* | (2006.01) |
| *B60W 20/10* | (2016.01) |
| *F01N 3/20* | (2006.01) |
| *F02D 35/02* | (2006.01) |
| *F02D 41/02* | (2006.01) |
| *F02D 41/08* | (2006.01) |
| *F02D 37/02* | (2006.01) |
| *F02D 41/00* | (2006.01) |

(52) U.S. Cl.
CPC ......... *F02D 35/0023* (2013.01); *B60W 10/06* (2013.01); *B60W 10/08* (2013.01); *B60W 20/10* (2013.01); *F01N 3/2006* (2013.01); *F02D 35/023* (2013.01); *F02D 37/02* (2013.01); *F02D 41/0007* (2013.01); *F02D 41/0255* (2013.01); *F02D 41/086* (2013.01); *B60W 2510/06* (2013.01); *B60W 2710/0605* (2013.01); *B60W 2710/0666* (2013.01); *B60W 2710/083* (2013.01); *F02D 2041/0012* (2013.01); *F02D 2200/0802* (2013.01); *F02D 2250/41* (2013.01); *Y02T 10/144* (2013.01); *Y02T 10/26* (2013.01)

(58) Field of Classification Search
CPC .......... F02D 41/0002; F02D 2041/389; F02D 37/02; F02D 13/06; F02D 41/062; F02D 2200/0406; F02D 41/0255; F02D 35/0023; F02D 41/0235; F01N 3/035; F01N 3/0878; F01N 3/021; F01N 3/0814; F01N 3/32; B60W 10/06; B60W 10/08; B60W 10/30
USPC ...................................................... 701/22, 60
See application file for complete search history.

(56) References Cited

U.S. PATENT DOCUMENTS

| | | | |
|---|---|---|---|
| 4,450,809 A * | 5/1984 | Onaka ..................... | F02P 5/103 123/406.7 |
| 5,497,745 A * | 3/1996 | Cullen .................... | F02D 37/02 123/339.11 |
| 6,381,955 B1 | 5/2002 | Morganti et al. | |

(Continued)

*Primary Examiner* — Courtney D Heinle
*Assistant Examiner* — Luis A Martinez Borrero
(74) *Attorney, Agent, or Firm* — Julia Voutyras; McCoy Russell LLP

(57) ABSTRACT

Systems and methods for increasing engine vacuum production and catalyst heating of a hybrid powertrain are described. In one example, a motor/generator rotates an engine at idle speed while the engine combusts air and fuel without providing torque sufficient to rotate the engine so that spark timing may be advanced or retarded from minimum spark timing for best torque to heat a catalyst and generate vacuum for vacuum consumers.

20 Claims, 5 Drawing Sheets

(56) References Cited

U.S. PATENT DOCUMENTS

| | | | |
|---|---|---|---|
| 6,568,177 B1* | 5/2003 | Surnilla | F02D 41/0087 123/198 F |
| 6,725,830 B2* | 4/2004 | Surnilla | F02D 17/02 123/339.11 |
| 6,868,827 B2* | 3/2005 | Surnilla | F01N 3/2006 123/339.11 |
| 7,104,044 B2 | 9/2006 | Moore et al. | |
| 7,168,239 B2* | 1/2007 | Ingram | F01N 3/2006 60/274 |
| 7,316,108 B2* | 1/2008 | Pott | F01N 13/00 60/299 |
| 8,056,540 B2 | 11/2011 | DeBastos et al. | |
| 9,404,402 B2* | 8/2016 | Pursifull | F01M 5/001 |
| 2003/0221664 A1* | 12/2003 | Surnilla | F02D 17/02 123/339.11 |
| 2003/0221666 A1* | 12/2003 | Surnilla | F02D 41/0045 123/339.19 |
| 2006/0016175 A1* | 1/2006 | Pott | F01N 13/00 60/285 |
| 2007/0056546 A1* | 3/2007 | Trask | F01L 9/04 123/179.18 |
| 2007/0056560 A1* | 3/2007 | Trask | F01L 9/04 123/435 |
| 2007/0284937 A1 | 12/2007 | Deiml et al. | |
| 2008/0066457 A1* | 3/2008 | Kim | B60K 6/48 60/286 |
| 2008/0164753 A1 | 7/2008 | Crombez et al. | |
| 2009/0241899 A1* | 10/2009 | Whitney | F02D 37/02 123/406.45 |
| 2009/0283070 A1* | 11/2009 | Whitney | F02D 11/105 123/339.11 |
| 2010/0038158 A1* | 2/2010 | Whitney | B60K 6/365 180/65.265 |
| 2010/0057325 A1* | 3/2010 | Livshiz | F02D 11/105 701/102 |
| 2010/0065376 A1* | 3/2010 | Pursifull | F01M 5/001 184/6.22 |
| 2010/0107608 A1* | 5/2010 | Mitsutani | B60K 6/445 60/285 |
| 2010/0108032 A1* | 5/2010 | Pursifull | B60W 10/06 123/406.12 |
| 2010/0204864 A1* | 8/2010 | Ando | B60W 20/10 701/22 |
| 2013/0125853 A1* | 5/2013 | Pursifull | F01M 5/001 123/196 AB |
| 2014/0069380 A1* | 3/2014 | Leone | F02D 9/04 123/406.12 |
| 2014/0297088 A1* | 10/2014 | Ando | B60K 6/445 701/22 |
| 2014/0306513 A1 | 10/2014 | Cunningham et al. | |
| 2014/0316682 A1* | 10/2014 | Whitney | F02D 11/105 701/108 |
| 2015/0336583 A1* | 11/2015 | Pursifull | B60W 30/18054 477/92 |
| 2016/0208720 A1* | 7/2016 | Hayashi | F02D 41/32 |

* cited by examiner

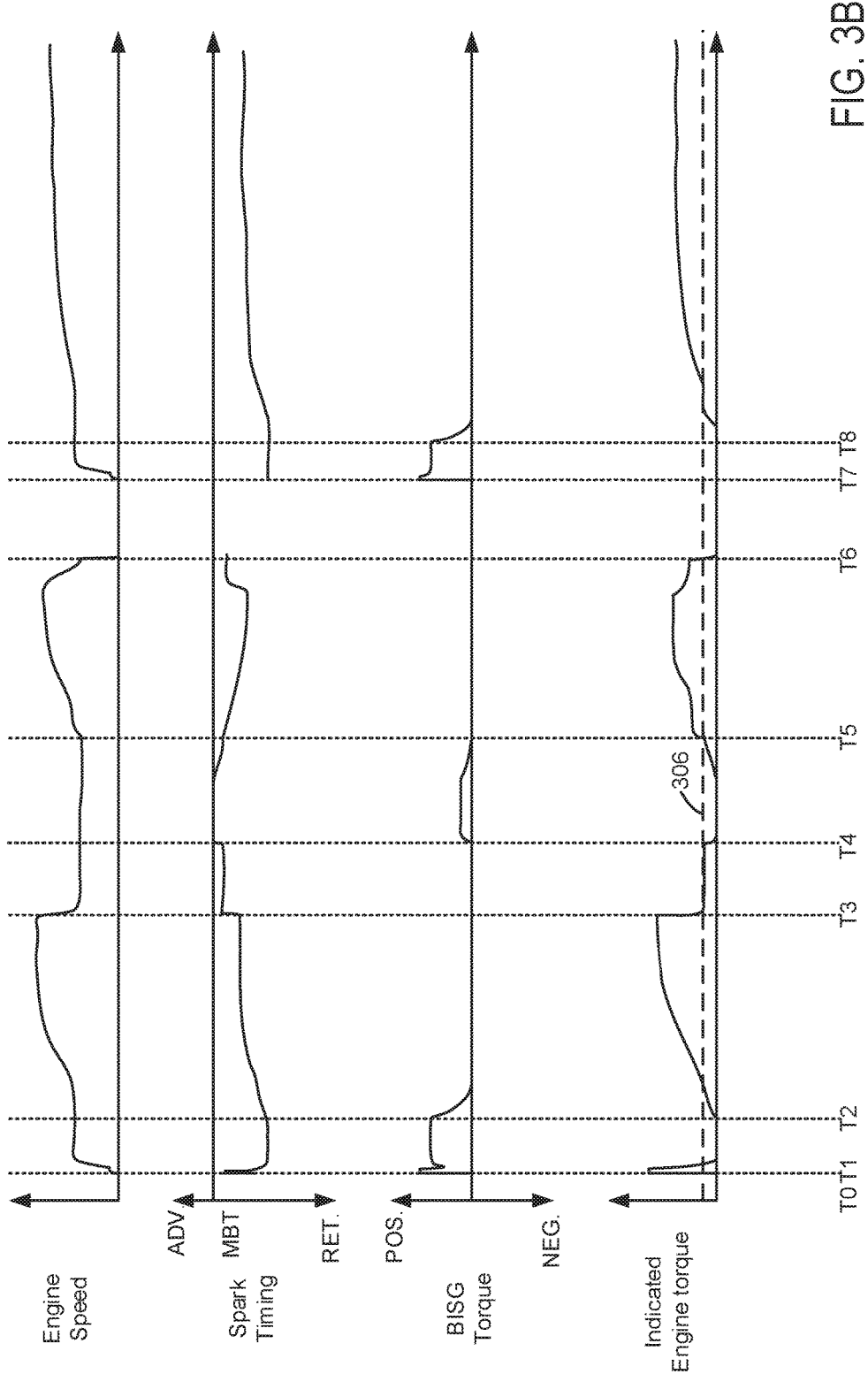

METHODS AND SYSTEM FOR OPERATING AN ENGINE

FIELD

The present description relates to methods and a system for operating a powertrain of a hybrid vehicle. The methods and systems may be particularly useful for hybrid vehicles that include an engine and a belt integrated starter/generator and/or a motor/generator.

BACKGROUND AND SUMMARY

An internal combustion engine may include a catalytic converter to process engine exhaust gases into $N_2$, $H_2O$ and $CO_2$. Once the catalyst has reached a catalyst light off temperature, the catalyst provides a threshold exhaust gas conversion efficiency. The catalyst light off temperature is much high than ambient temperature. Consequently, the catalyst may not convert exhaust gases efficiently as is desired after an engine has started from ambient conditions. One way to increase catalyst efficiency during engine starting is to retard spark timing from a base spark timing shortly after engine starting so that a greater percentage of heat released from combustion of air and fuel in the cylinder reaches the catalyst. Further, an amount of air inducted to engine cylinders can be increased to further increase catalyst temperature sooner after engine start. However, increasing an amount of air inducted to the engine reduces vacuum produced by the engine. As a result, the engine may be able to supply less vacuum to vacuum consumers, such as vehicle brakes, during engine starting. If a driver applies vehicle brakes after engine starting when low vacuum is present, the driver may experience hard brake pedal feel. Thus, it may be desirable to provide a way of heating a catalyst while providing vacuum to vacuum consumers during low driver demand torque conditions.

The inventors herein have recognized the above-mentioned issues and have developed an engine operating method, comprising: combusting air and fuel within cylinders of an engine at an idle speed while providing engine torque insufficient to rotate the engine at the idle speed; and rotating the engine at the idle speed via torque produced by a motor while providing engine torque insufficient to rotate the engine at the idle speed in response to a request to heat a catalyst.

By commanding a motor to rotate an engine while the engine is combusting air and fuel at an idle speed and producing torque insufficient to rotate the engine, an increased amount of thermal energy may be provided to heat a catalyst. For example, spark timing of the engine may be retarded from minimum spark timing for best engine torque (MBT) so that the engine produces torque insufficient to rotate the engine at idle speed. The retarded spark timing delays ignition so that additional heat flows out of the engine to the catalyst. Further, the engine may be rotated via the motor to generate additional vacuum. By lowering the load on the engine via the motor, the engine may operate with less air so that the throttle may be closed further to generate additional vacuum for vacuum consumers on board the vehicle.

The present description may provide several advantages. Specifically, the approach may reduce catalyst heating time and reduce engine emissions. Further, the approach may provide increased vacuum when vacuum may be difficult to produce. Further still, the approach provides a way of heating a catalyst via the vehicle's battery without having to install an electrical heater in the vehicle's exhaust system.

For example, by motoring an engine with 2 kW of energy provided by a motor, the engine is able to produce approximately 2 kW of additional catalyst heat at the same intake manifold vacuum level if the engine provided heat to the catalyst without the motor. Or, the engine can produce a deeper vacuum at the same catalyst heating level. This approach provides a surprising serendipitous result. Specifically, since the engine is being motored primarily with an electric motor instead of combustion torques, it smoothness increased remarkably and allows even greater spark retard where without this feature, the engine would encounter a problematic combustion stability limit while spark was being retarded. Thus, rapid catalyst heating may be achieved while maintain a desired intake manifold vacuum while experiencing increased engine smoothness during catalyst heating. Further, the approach enables running the engine at very low Indicated Mean Effective Pressure (IMEP), which is known to produce low hydrocarbon emissions and is one objected for fast catalyst light-off. As such, the catalyst heating is performed while producing a fewer hydrocarbon emissions than would occur if the combustion pressures were spinning the engine.

The intake vacuum is provided by rotating the engine via the motor is useful for crankcase ventilation, fuel vapor purge, low pressure EGR, exhaust heat recovery, vacuum actuators (such as brake boost, adjustable engine mounts, 4×4 hub locks).

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIGS. 3A and 3B show an example operating sequence according to the method of FIG. 4.

DETAILED DESCRIPTION

Figure 1:
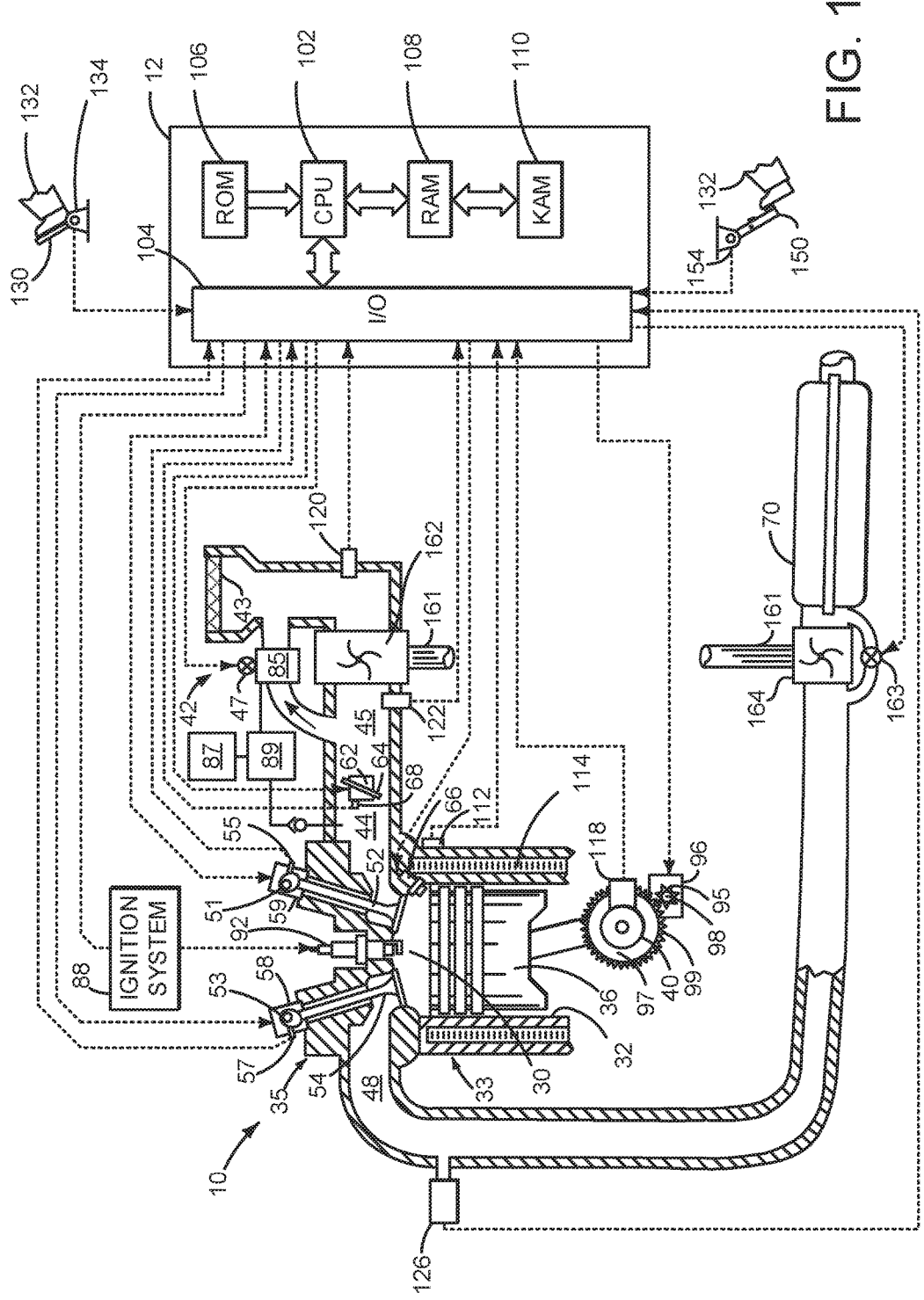
FIG. 1 is a schematic diagram of an engine.

The present description is related to increasing catalyst heating and vacuum production via a motor of a hybrid vehicle. The motor may be included in a parallel or series hybrid vehicle. The hybrid vehicle may include an engine as shown in FIG. 1. The engine of FIG. 1 may be included in a driveline shown in FIG. 2. The system of FIGS. 1 and 2 may provide the operating sequence shown in FIGS. 3A and 3B. The method of FIG. 4 may be included in the system of FIGS. 1 and 2 to provide the operating sequence illustrated in FIGS. 3A and 3B.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Waste gate 163 may be adjusted via controller 12 to allow exhaust gases to selectively bypass turbine 164 to control the speed of compressor 162. Air filter 43 cleans air entering engine air intake 42.

Aspirator or venturi 85 receives pressurized air from boost chamber 45 that causes low a low pressure zone to develop in aspirator 85. The low pressure region causes air to flow from vacuum reservoir 89 to aspirator 85 and into air intake 42 upstream of compressor 162 along with pressurized air. Valve 47 controls flow of pressurized air through aspirator 85 such that aspirator 85 is deactivated when valve 47 is closed, and aspirator 85 provides vacuum when valve 47 is open and positive pressure is in boost chamber 45. Air may also be drawn from vacuum reservoir into intake manifold 44 when pressure in intake manifold 44 is lower than pressure in vacuum reservoir 89. Vacuum reservoir 89 provides vacuum to vacuum consumers 87. Vacuum consumers may include but are not limited to brake boosters, waste gate actuators, and vehicle climate control systems.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by driver 132; a position sensor 154 coupled to brake pedal 150 for sensing force applied by driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
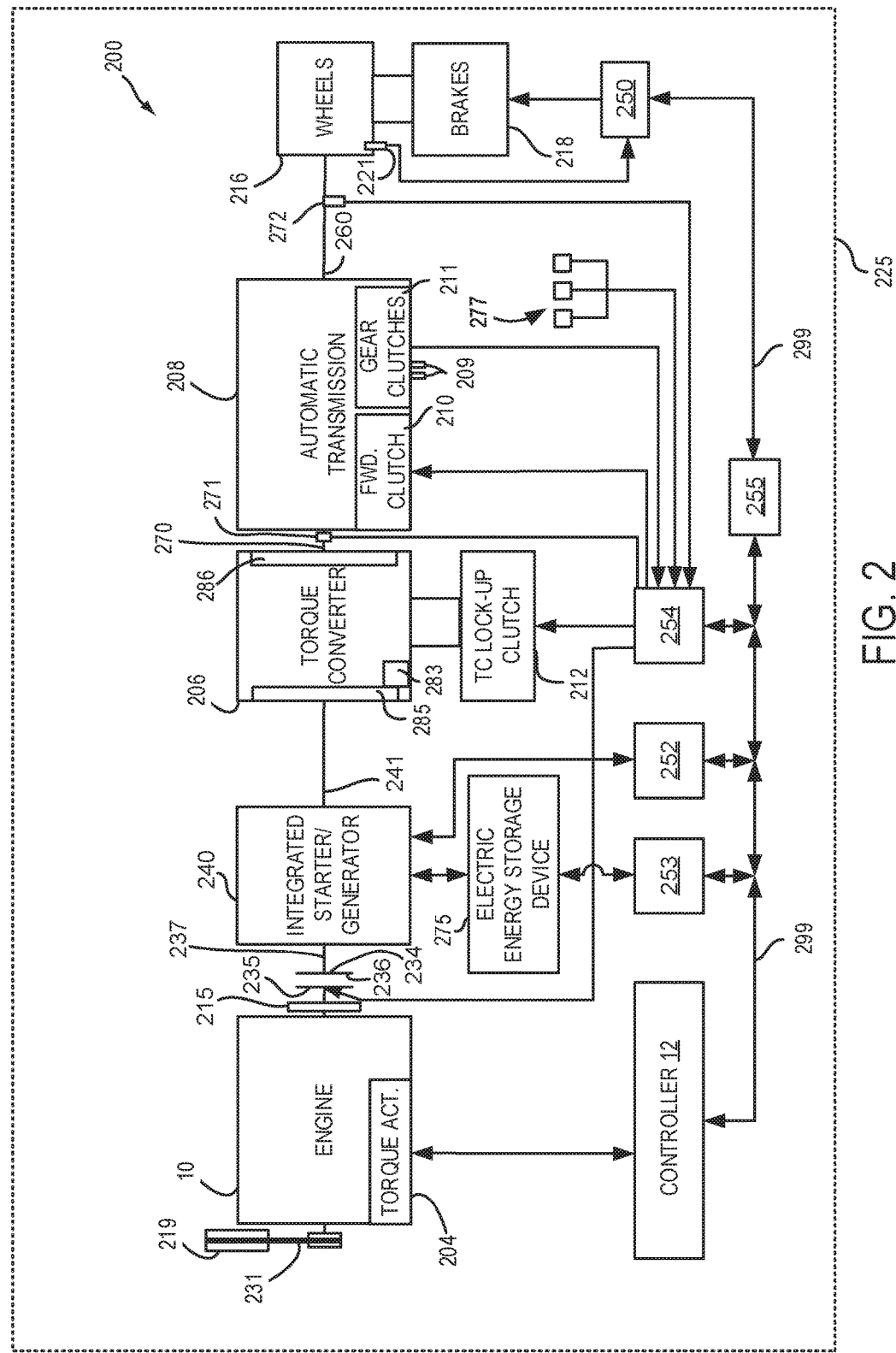
FIG. 2 is a schematic diagram of a hybrid vehicle driveline.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a first braking torque from electric machine controller 252 and a second braking torque from brake controller 250, the first and second torques providing the desired braking torque at vehicle wheels 216.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. In other examples, engine 10 may be omitted. Engine 10 may be started with an engine starting system shown in FIG. 1, via belt integrated starter/generator (BISG) 219, or via driveline integrated starter/generator (ISG) 240 also known as a motor/generator. Driveline ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

BISG is mechanically coupled to engine 10 via belt 231. BISG may be coupled to crankshaft 40 or a camshaft (e.g., 51 or 53). BISG may operate as a motor when supplied with electrical power via electric energy storage device 275. BISG may operate as a generator supplying electrical power to electric energy storage device 275.

An engine output torque may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide torque to powertrain 200 or to convert powertrain torque into electrical energy to be stored in electric energy storage device 275 in a regeneration mode. ISG 240 is in electrical communication with energy storage device 275. ISG 240 has a higher output torque capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive torque or a negative torque to powertrain 200 via operating as a motor or generator as instructed by electric machine controller 252.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then allocates a fraction of the requested driver demand torque to the engine and the remaining fraction to the ISG or BISG. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the ISG 240 (e.g., desired powertrain wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Any portion of desired negative wheel torque that may not be provided by ISG 240 because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller 255 with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, and ambient temperature sensors.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

Thus, the system of FIGS. 1 and 2 provides for a system, comprising: an engine; a transmission coupled to the engine; a motor/generator coupled to the engine via a belt; and a vehicle system controller including executable instructions stored in non-transitory memory to rotate the engine at an idle speed via the motor/generator while the engine is combusting air and fuel in response to a request for vacuum, the engine producing torque that is insufficient to rotate the engine at the idle speed when the engine is at its warmed-up operating temperature. The system further comprises additional instructions to operate the engine at minimum spark timing for best torque while rotating the engine at the idle speed.

In some examples, the system further comprises additional instructions to retard spark timing from minimum spark timing for best torque while rotating the engine at the idle speed while the engine is producing torque that is insufficient to rotate the engine at the idle speed in response to a request to heat a catalyst. The system further comprises an ignition system and additional instructions to provide spark to the engine at minimum spark timing for best torque while the engine is producing torque that is insufficient to rotate the engine at the idle speed. The system further comprises additional instructions to close a throttle of the engine in response to the request for vacuum. The system further comprises additional instructions to activate an aspirator in response to the request for vacuum.

Figure 3A:
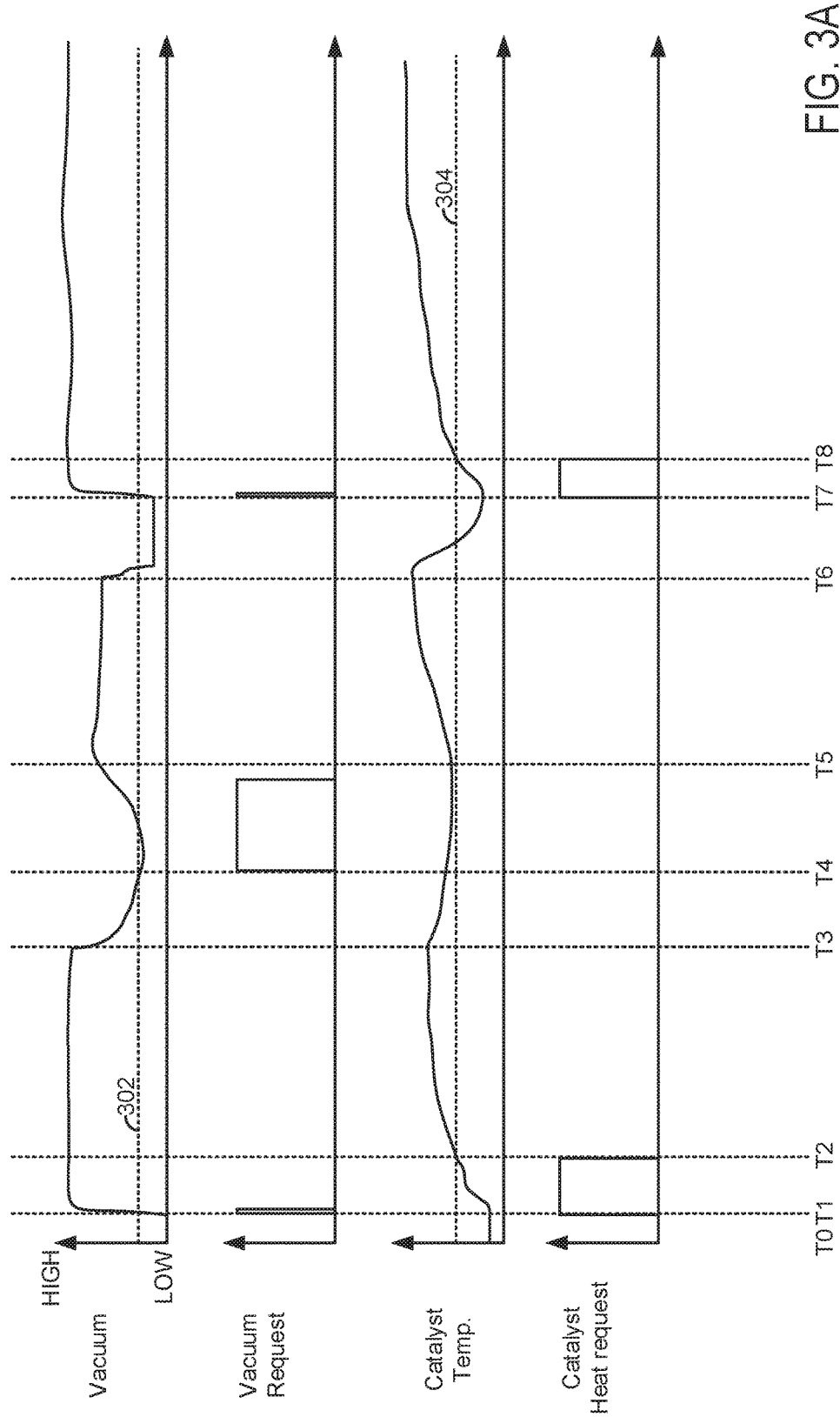

Referring now to FIGS. 3A and 3B, example plots of a vehicle operating sequence are shown. The operating sequence may be performed via the system of FIGS. 1 and 2 in cooperation with the method of FIG. 4. Vertical lines at times T0-T8 represent times of interest during the sequence. The plots in FIGS. 3A and 3B are time aligned and occur at the same time.

The first plot from the top of FIG. 3A is a plot of vacuum reservoir vacuum level (e.g., an indication of an amount of vacuum in the vacuum reservoir) versus time. The vertical axis represents vacuum level and vacuum level increases (e.g., greater vacuum or lower pressure) in the direction of the vertical axis arrow. The horizontal axis represents time and time increases from the left side of the figure to the right side of the figure. Horizontal line 302 represents a threshold vacuum where a vacuum request is made in response to vacuum in the vacuum reservoir (e.g., 89 of FIG. 1) being less than the level of horizontal line 302.

The second plot from the top of FIG. 3A is a plot of a vacuum request state versus time. A request for increased vacuum is present when the trace is at a higher level near the vertical axis arrow. A request for increased vacuum is not present the trace is at a lower level near the horizontal axis. The vacuum threshold to begin taking special action to make vacuum may be lower than the vacuum level to cease taking special actions to make vacuum.

The third plot from the top of FIG. 3A is a plot of catalyst temperature versus time. The catalyst temperature increases in the direction of the vertical axis arrow. The horizontal axis represents time and time increases from the left side of the figure to the right side of the figure. Horizontal line 304 represents a threshold catalyst light off temperature above which catalyst efficiency may be greater than a threshold efficiency.

The fourth plot from the top of FIG. 3A is a plot of a catalyst heating request versus time. The vertical axis represents the catalyst heating request state and the catalyst heating request is asserted when the trace is at a higher level near the vertical axis arrow. The catalyst heating request is not asserted when the catalyst heating request state trace is near the horizontal axis. The catalyst heating request indicates a desire to increase catalyst temperature. The catalyst temperature may be increased via supplying additional thermal energy from the engine to the catalyst.

The first plot from the top of FIG. 3B is a plot of engine speed versus time. The vertical axis represents engine speed and engine speed increases in the direction of the vertical axis arrow. The horizontal axis represents time and time increases from the left side of the figure to the right side of the figure.

The second plot from the top of FIG. 3B is a plot of engine spark timing versus time. The Spark timing is at MBT spark timing when the trace is at the level of the horizontal axis. Spark timing is advanced from MBT timing when the trace is above the horizontal axis. Spark timing is retarded from MBT timing when the trace is below the horizontal axis. The horizontal axis represents time and time increases from the left side of the figure to the right side of the figure.

The third plot from the top of FIG. 3B is a plot of BISG output torque versus time. The BISG output torque is positive (e.g., providing torque to the driveline) when the trace is above the horizontal line. The BISG output torque is negative (e.g., absorbing torque from the driveline) when the trace is below the horizontal line. The horizontal axis represents time and time increases from the left side of the figure to the right side of the figure. The BISG/ISG shows a positive torque during engine start, drivetrain assist, and catalyst heating. The BISG/ISG would show a negative torque during brake energy regeneration, battery charging, or electrical power supply needs.

The fourth plot from the top of FIG. 3B is a plot of indicated engine torque versus time. The vertical axis represents indicated engine torque and indicated engine torque increases in the direction of the vertical axis arrow. The horizontal axis represents time and time increases from the left side of FIG. 3B to the right side of FIG. 3B. Horizontal line 306 represents an indicated engine crankshaft for rotating the engine at a base engine idle speed (e.g., engine idle speed when the engine is fully warmed to its warm operating temperature) when the engine is warm. Alternatively, horizontal line 306 may be a torque to accelerate the engine from cranking speed to the base engine idle speed in a threshold amount of time. Indicated engine torque may be found according to the equation:

$$T_B = T_{IND} - (T_{FRIC} + T_{PUMP})$$

where $T_B$ is engine brake torque, $T_{IND}$ is indicated engine torque, $T_{FRIC}$ is engine friction torque, and $T_{PUMP}$ is engine pumping torque.

At time T0, engine speed is zero indicating that the engine is not operating and rotating. Further, the vacuum level is low and vacuum is not being requested. The catalyst temperature is also low and the catalyst heating request is not asserted. Spark is not supplied to the engine and BISG torque is zero. The indicated engine torque is also zero.

At time T1, the engine is cranked (e.g., rotated at 250 RPM) by the BISG. The spark timing is retarded a small amount from MBT. The BISG torque is positive since the BISG is rotating the engine. The indicated engine torque increases at a first combustion event. The vacuum level in the vacuum reservoir begins to increase as pistons pump air from the engine intake manifold while the engine is rotating. The vacuum request is asserted since there is little vacuum in the vacuum reservoir. The catalyst temperature is low and the catalyst heat request is asserted to call for heat to be supplied to the catalyst.

Between time T1 and time T2, the engine accelerates from torque produced by combustion in the engine. The indicated engine torque increases as air and fuel are combusted, but indicated engine torque is reduced to a level below 306 in response to the engine being at idle speed. The amount of vacuum in the vacuum reservoir increases as the engine speed increases and pressure in the engine intake manifold is pumped down. The vacuum request is not asserted after the vacuum amount increases. The catalyst temperature increases as heat from combustion is directed to the catalyst in the engine exhaust system. Engine speed levels off at idle speed. Engine spark timing is retarded after the engine accelerates to the idle speed. BISG torque decreases as the engine accelerates. BISG torque increases after the engine reaches idle speed. The BISG torque is increased while the engine spark is being retarded so that the engine torque reduction caused by retarding spark is compensated by BISG torque increasing, which holds or maintains engine speed at idle speed.

In this way, between time T1 and time T2, indicated engine torque is decreased to less than an amount to rotate the engine at idle speed. Retarding spark timing decreases indicated engine torque and increases an amount of thermal energy provided to the catalyst. The BISG rotates the engine to exhaust combusted gases from a cylinder that heats the catalyst yet provides little pressure in the cylinder since the gases combust so late in a cycle of the cylinder. Thus, the BISG provides the torque to provide force to move exhaust gases to the catalyst. Consequently, a greater portion of energy from combusting air and fuel may be transferred to the catalyst, thereby reducing an amount of time it takes to heat the catalyst above light off temperature. Generally, BISG/ISG torque is positive until the catalyst reaches its target minimum temperature.

At time T2, the catalyst reaches light off temperature. The catalyst heat request is transitioned to not asserted in response to the catalyst reaching light off temperature. Engine spark timing is advanced and positive BISG torque is reduced in response to the catalyst reaching light off temperature. By advancing spark timing, the indicated engine torque increases. The vacuum level is high and the vacuum request is not asserted.

Between time T2 and time T3, the engine speed increases and the catalyst temperature increases. The amount of vacuum stored in the vacuum reservoir remains substantially constant. The vacuum may not be replenished at a desired rate at higher engine loads, especially if pressure in the intake manifold becomes positive. The catalyst heating request remains not asserted and engine spark timing is retarded a small amount from MBT. The BISG is not providing torque to the driveline and indicated engine torque increases in response to an increase in requested engine brake torque. Engine brake torque may be requested via an accelerator pedal, a controller, or another input device.

At time T3, the indicated engine torque is decreased in response to a driver at least partially releasing an accelerator pedal (not shown). The driver applies the brakes and vacuum is consumed. Spark timing is advanced toward MBT while the engine is operating at low load or low torque output. Engine speed decreases in response to the decrease in accelerator pedal position. The BISG torque remains at zero and vacuum in the vacuum reservoir continues to be consumed by vacuum consumers. The vacuum request remains not asserted and the catalyst temperature begins to be reduced. The catalyst heating request is not asserted since catalyst temperature is greater than threshold 304.

Between time T3 and time T4, the engine speed decreases to idle speed and the amount of vacuum in the vacuum reservoir continues to decrease. Vacuum is not requested and catalyst temperature also continues to decrease. Catalyst heating is not requested and spark timing is slightly retarded from MBT. BISG torque is zero and indicated engine torque is at a level of 306 so that the engine speed is maintained at idle speed.

At time T4, additional vacuum is requested as indicated by the vacuum request transitioning to a higher level. The catalyst temperature is greater than the temperature at 304 and catalyst heating is not requested. Spark timing is advanced to MBT in response to the request for additional vacuum. Positive BISG torque is increased and indicated engine torque is decreased, while engine speed is maintained. Indicated engine torque is decreased via at least partially closing the engine throttle (not shown), which also increases vacuum production by the engine. By closing the throttle and maintaining engine speed at idle speed via BISG torque, a large amount of vacuum may be produced in a short amount of time. Further, indicated engine torque is very low so that both BISG and engine torque are the basis for generating vacuum and maintaining the engine at idle speed.

Between time T4 and time T5, indicated engine torque is decreased and is then increased as the vacuum level in the vacuum reservoir increases. The BISG torque is increased and then decreased so that engine idle speed is maintained. The driver does not request increased engine torque during this time period. The vacuum request remains asserted until shortly before time T5 and the amount of vacuum increases. The catalyst temperature remains above level 304 and catalyst heating is not requested.

At time T5, the driver requests engine torque (not shown) and engine speed begins to increase in response to the requested increase in engine torque. Spark timing is retarded from MBT and BISG torque is zero. Vacuum is not requested and vacuum is at a higher level. Catalyst temperature is above threshold 304 and catalyst heating is not requested. The indicated engine torque increases in response to the driver's request.

Between time T5 and time T6, the engine speed increases and decreases in response to driver demand torque (not shown). The spark timing is retarded from MBT and BISG torque is zero. The indicated engine torque increases and decreases with driver demand torque. Catalyst heating is not requested and catalyst temperature is greater than level 304.

At time T6, the engine is stopped (e.g., combustion stops and the engine stops rotating) and engine speed is zero. Spark delivery to the engine ceases and BISG torque is zero. Indicated engine torque is zero and vacuum stored in the vacuum reservoir is at a higher level. The catalyst temperature is also at a higher level and catalyst heating is not requested.

Between time T6 and time T7, the amount of vacuum stored in the vacuum reservoir decreases. The vacuum level may be decreased via applying and releasing vehicle brakes, leaks, or use of vacuum via other vacuum consumers. The catalyst temperature also decreases and catalyst heating is not requested since the engine is stopped. Engine speed remains zero and BISG torque is zero.

At time T7, the engine is cranked by the BISG. Specifically, BISG torque is increased to crank the engine. The amount of vacuum stored in the vacuum reservoir is low, so the vacuum request is asserted. The catalyst temperature is also low, which causes catalyst heating to be requested.

Between time T7 and time T8, the engine is accelerated to idle speed via torque provided by the BISG. Indicated engine torque remains below threshold 306, which allows additional heat to be supplied to the catalyst. The catalyst temperature increases and the vacuum level increases as engine speed is increased and exhaust gases are directed to the catalyst. Spark timing is retarded from MBT to increase catalyst heating and reduce indicated engine torque. At time T8, the catalyst temperature is greater than threshold 304.

Consequently, spark timing is advanced and BISG torque is reduced. The catalyst heating request is also transitioned to not asserted in response to catalyst temperature increasing above threshold 304. The engine speed remains at idle speed since the accelerator pedal is not applied (not shown).

Thus, the engine start at time T7 differs from the engine start at time T1 for at least the reason that indicated engine torque remains below threshold 306 during engine starting and idling. Such operation may increase catalyst heating since less exhaust gas energy may be converted to engine torque.

The motor torque shown in FIGS. 3A and 3B may be provided by the BISG (e.g., 219 of FIG. 2) or the ISG (e.g., 240 of FIG. 2). The motor torque enables the engine to rotate at engine idle speed.

Figure 4:
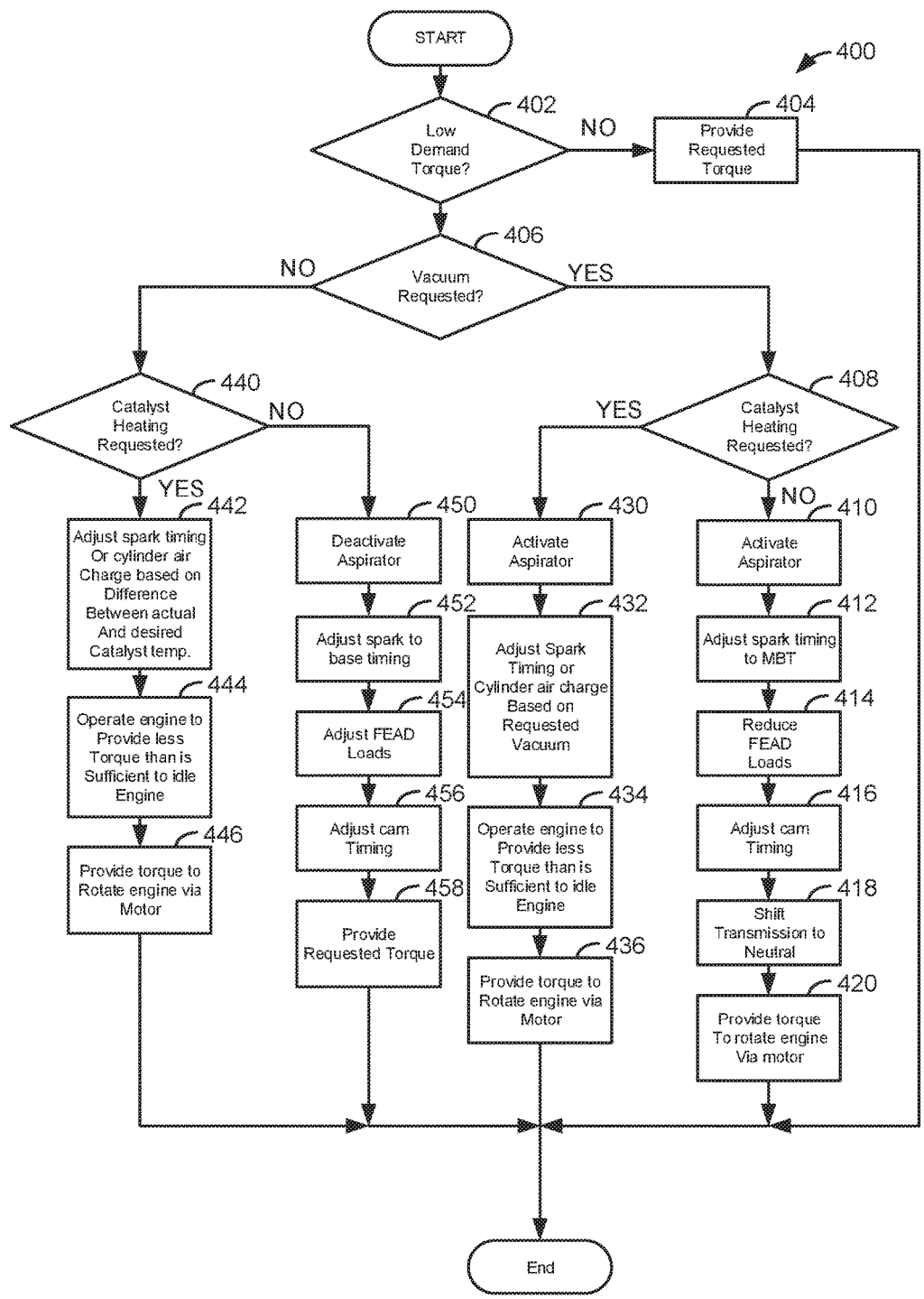
FIG. 4 describes a method for operating a hybrid vehicle.

Referring now to FIG. 4, an example flow chart for a method for operating a hybrid vehicle driveline is shown. The method of FIG. 4 may be incorporated into and may cooperate with the system of FIGS. 1 and 2. Further, at least portions of the method of FIG. 4 may be incorporated as executable instructions stored in non-transitory memory while other portions of the method may be performed via a controller transforming operating states of devices and actuators in the physical world.

At 402, method 400 judges if driver demand torque or a requested driveline torque is low. Driver demand torque or requested driveline torque may be low if the accelerator pedal is not applied or if the accelerator is applied less than a threshold amount. The requested driveline torque may be provided via a driver or a controller. The driver demand torque may be converted into a requested engine torque or torque at a transmission input shaft. For example, a position of an accelerator pedal may be input to a transfer function that outputs a requested or desired engine torque or transmission input shaft torque. If method 400 judges that a low demand torque is requested, the answer is yes and method 400 proceeds to 406. Otherwise, the answer is no and method 400 proceeds to 404.

At 404, method 400 provides the amount of torque requested by the driver or the controller. In one example, the driver demand torque is provided solely via the engine. In another example, the driver demand torque is provided solely via the motor. In still another example, the driver demand torque is provided via the engine and the motor. Engine torque is adjusted via adjusting engine torque actuators. Motor torque is adjusted via adjusting current supplied to the motor. Method 400 proceeds to exit after supplying the requested torque.

Additionally, if vacuum is not requested the aspirator may be commanded off, spark timing may be adjusted to base spark timing, front end accessory drive (FEAD) loads may be adjusted to requested levels, cam timing may be adjusted to base timing, the transmission may be shifted according to a predetermined shift schedule, and torque may be provided to the driveline via the BISG or ISG according to driver demand torque, battery state of charge, and other conditions.

At 406, method 400 judges if vacuum is requested. In one example, vacuum is requested in response to an amount or level of vacuum in a vacuum reservoir is less than a threshold amount. If method 400 judges that vacuum is requested, the answer is yes and method 400 proceeds to 408. Otherwise, the answer is no and method 400 proceeds to 440.

At 408, method 400 judges if catalyst heating is requested. In one example, catalyst heating is requested if catalyst temperature is less than a predetermined catalyst light off temperature. Catalyst temperature may be measured or inferred. If method 400 judges that catalyst heating is requested, the answer is yes and method 400 proceeds to 430. Otherwise, the answer is no and method 400 proceeds to 410.

At 410, method 400 activates an aspirator if one is present. Activating the aspirator may provide additional vacuum to the vacuum reservoir. The aspirator may be activated when driver demand torque is low and intake manifold pressure is high, such as during a driver releasing an accelerator pedal. Method 400 proceeds to 412.

At 412, method 400 adjusts engine spark timing to MBT. By advancing spark timing to MBT when catalyst heating is not requested, torque produced by each engine cylinder may be increased so that the engine throttle may be at least partially closed to increase vacuum generated by the engine while the requested engine torque is provided. Method 400 proceeds to 414.

At 414, method 400 reduces loads applied to engine front end accessory drive (FEAD). Front end accessory drive loads may include but are not limited to alternator, air conditioning compressor, and power steering pump. By reducing FEAD loads, the engine may be maintained at a desired speed via combusting less fuel and air so that engine intake manifold pressure may be reduced to increase the engine's vacuum production. Method 400 proceeds to 416.

At 416, method 400 adjusts cam timing to increase engine vacuum. In one example, cam timing is adjusted to close intake valves near bottom-dead-center to increase an amount of air trapped in engine cylinders. Accordingly, the throttle opening amount may be decreased at the same time so engine speed and torque may be maintained. Further, closing the throttle further increases engine intake manifold vacuum to increase vacuum production by the engine. Method 400 proceeds to 418.

At 418, method 400 shifts the transmission to neutral. By shifting the transmission to neutral, load applied to the engine is further reduced so that engine speed and torque may be maintained with a less open throttle. In particular, shifting to neutral eliminates the torque converter load torque which is favorable for exhaust heat, reduced HC, and enhanced intake manifold vacuum. Method 400 proceeds to 420.

At 420, method 400 provides motor torque to accelerate and rotate the engine at a desired speed (e.g., idle speed). The motor may be a BISG, ISG, or other motor in the driveline. As motor torque increases, engine torque may be reduced to maintain engine speed at a desired speed. Engine torque may be reduced via closing the throttle further so that less air may be inducted into the engine, thereby increasing engine vacuum production in the engine intake manifold. Method 400 proceeds to exit after adjusting motor torque to increase engine vacuum production.

At 430, method 400 activates an aspirator if one is present. Activating the aspirator may provide additional vacuum to the vacuum reservoir. The aspirator may be activated when driver demand torque is low and intake manifold pressure is high, such as during a driver releasing an accelerator pedal. Method 400 proceeds to 432.

At 432, method 400 adjusts spark timing or cylinder air charge (e.g., an amount of air in a cylinder participating in combustion in the cylinder) based on a requested amount of vacuum and catalyst heating. In one example, a table of holding empirically determined spark timings based on vacuum reservoir vacuum level and catalyst temperature is indexed to determine spark timing or cylinder air charge. The table is indexed by a vacuum level based on a desired vacuum level in a vacuum reservoir minus an actual vacuum level in the vacuum reservoir and a catalyst temperature based on a difference between the catalyst light off temperature minus an actual catalyst temperature. In this way, the spark timing may be weighted based on the difference between desired and actual vacuum. Further, the spark timing may be weighted based on the difference between catalyst light off temperature and actual catalyst temperature. For example, if a difference between a desired vacuum level in a vacuum reservoir minus an actual vacuum level in the vacuum reservoir is greater than a threshold and if a difference between the catalyst light off temperature minus an actual catalyst temperature is less than a threshold, spark timing may be adjusted close to MBT (e.g., three crankshaft degrees retarded from MBT). However, if the difference between the desired vacuum level in the vacuum reservoir minus the actual vacuum level in the vacuum reservoir is less than a threshold and if a difference between the catalyst light off temperature minus an actual catalyst temperature is greater than a threshold, spark timing may be adjusted farther away from MBT (e.g., fifteen crankshaft degrees retarded from MBT).

In another example, a table of holding empirically determined cylinder air charge values based on vacuum reservoir vacuum level and catalyst temperature is indexed to determine cylinder air charge. The table is indexed by a vacuum level based on a desired vacuum level in a vacuum reservoir minus an actual vacuum level in the vacuum reservoir and a catalyst temperature based on a difference between the catalyst light off temperature minus an actual catalyst temperature. For example, if a difference between a desired vacuum level in a vacuum reservoir minus an actual vacuum level in the vacuum reservoir is greater than a threshold and if a difference between the catalyst light off temperature minus an actual catalyst temperature is less than a threshold, cylinder air charge may be adjusted to a smaller value X. However, if the difference between the desired vacuum level in the vacuum reservoir minus the actual vacuum level in the vacuum reservoir is less than a threshold and if a difference between the catalyst light off temperature minus an actual catalyst temperature is greater than a threshold, cylinder air charge may be adjusted to a larger value Y, Y being larger than X.

In this way, spark timing and/or cylinder air charge adjustments may be weighted to bias the engine to provide more to heat the catalyst or to provide vacuum. As such, if an engine is started while there is no vacuum in a vacuum reservoir, engine operation may be adjusted to increase vacuum. After a few combustion events, engine operation may be adjusted to increase catalyst heating based on the progression of vacuum level in the vacuum reservoir. In some examples, cylinder air charge and spark adjustments may be delayed during engine starting until a predetermined actual total number of combustion events since the last engine stop. Method 400 proceeds to 434.

At 434, method 400 adjusts the other of spark timing or cylinder air charge adjusted at 432 to operate the engine at a lower indicated engine torque than is sufficient to operate the engine at a base engine idle speed when the engine is warmed-up to its nominal warm operating temperature (e.g., 90° C.) while the engine combusts stoichiometric air-fuel mixtures. Additionally, or alternatively, cylinder air charge may be adjusted to an amount less than is sufficient to operate the engine at a based engine idle speed when the engine is warmed-up to its nominal warm operating conditions while the engine combusts stoichiometric air-fuel mixtures. In particular, if spark timing is adjusted at 432, cylinder air charge is adjusted at 434. Conversely, if cylinder air charge is adjusted at 432, spark timing is adjusted at 434. Thus, the indicated torque produced by the engine is less than torque to rotate the engine at its base idle speed and less than torque to accelerate the engine from cranking speed to idle speed in a threshold amount of time. In one example, the spark timing adjustments or cylinder air charge adjustments at 434 are empirically determined based on a desired indicated engine torque and the spark or cylinder air charge values determined at 432. Method 400 proceeds to 436.

At 436, method 400 provides torque via the motor sufficient to accelerate the engine to its an idle speed (e.g., a base idle speed) and rotate the engine at a base engine idle speed. The idle speed may be adjusted based on engine temperature. The motor may be operated in a speed control mode where a desired speed is followed by the motor while motor torque is allowed to vary. Alternatively, the motor may be operated in a torque control mode where motor torque follows a desired torque. In one example, the engine is rotated at a cranking speed and then accelerated (run-up) to idle speed during engine starting. Method 400 proceeds to exit.

At 440, method 400 judges if catalyst heating is requested. In one example, catalyst heating is requested if catalyst temperature is less than a predetermined catalyst light off temperature. Catalyst temperature may be measured or inferred. If method 400 judges that catalyst heating is requested, the answer is yes and method 400 proceeds to 442. Otherwise, the answer is no and method 400 proceeds to 450.

At 450, method 400 deactivates an aspirator if one is present. Deactivating the aspirator ceases vacuum production and increases engine efficiency. The aspirator may be deactivated when the amount of vacuum in the vacuum reservoir is greater than a threshold vacuum. Method 400 proceeds to 452.

At 452, method 400 adjusts engine spark timing to base spark timing. Base spark timing may be retarded from MBT to provide a torque reserve that allows engine torque to increase via spark timing adjustments in response to a change in engine load. In this way, engine torque may respond more quickly to changes in engine load as compared to if engine torque is adjusted solely via a throttle or other air actuator. Method 400 proceeds to 454.

At 454, method 400 adjusts loads applied to engine front end accessory drive (FEAD) back to base levels. For example, load applied by an alternator to an engine may be increased to increase battery state of charge. Method 400 proceeds to 456.

At 456, method 400 adjusts cam timing back to base timing. In one example, base cam timing values are stored in a table that is indexed via engine speed and torque. Method 400 proceeds to 458.

At 458, method 400 provides the amount of torque requested by the driver or the controller. The requested torque may be provided via the engine, the motor and the engine, or via the motor. Method 400 proceeds to exit after supplying the requested torque.

At 442, method 400 adjusts spark timing or cylinder air charge (e.g., an amount of air in a cylinder participating in combustion in the cylinder) based on catalyst temperature. In one example, a table of holding empirically determined spark timings based on catalyst temperature is indexed to determine spark timing or cylinder air charge. The table is indexed by a catalyst temperature based on a difference between the catalyst light off temperature minus an actual catalyst temperature. For example, if a difference between the catalyst light off temperature minus an actual catalyst temperature is less than a threshold, spark timing may be adjusted close to MBT (e.g., six crankshaft degrees retarded from MBT). However, if the difference between the catalyst light off temperature minus an actual catalyst temperature is greater than a threshold, spark timing may be adjusted farther away from MBT (e.g., twenty crankshaft degrees retarded from MBT).

In another example, a table of holding empirically determined cylinder air charge values based on catalyst temperature is indexed to determine cylinder air charge. The table is indexed by a catalyst temperature based on a difference between the catalyst light off temperature minus an actual catalyst temperature. For example, if a difference between the catalyst light off temperature minus an actual catalyst temperature is less than a threshold, cylinder air charge may be adjusted to a smaller value Q. However, if the difference between the catalyst light off temperature minus an actual catalyst temperature is greater than a threshold, cylinder air charge may be adjusted to a larger value Z, Z being larger than Q. Additionally, or alternatively, the table may include a dimension that is indexed based on a desired rate of catalyst heating so that the cylinder air charge is adjusted based on a rate of catalyst heating.

In this way, spark timing and/or cylinder air charge adjustments may be adjusted to control catalyst heating as a function of a difference between catalyst light off temperature and actual catalyst temperature or inferred catalyst temperature. As such, if an engine is started while catalyst temperature is just less than catalyst light off temperature, the engine may be operated to provide less catalyst heating to improve engine efficiency. Method 400 proceeds to 444.

At 444, method 400 adjusts the other of spark timing or cylinder air charge adjusted at 442 to operate the engine at a lower indicated engine torque than is sufficient to operate the engine at a base engine idle speed when the engine is warmed-up to its nominal warm operating temperature (e.g., 90° C.) while the engine combusts stoichiometric air-fuel mixtures. Additionally, or alternatively, cylinder air charge may be adjusted to an amount less than is sufficient to operate the engine at a based engine idle speed when the engine is warmed-up to its nominal warm operating conditions while the engine combusts stoichiometric air-fuel mixtures. In particular, if spark timing is adjusted at 442, cylinder air charge is adjusted at 444. Conversely, if cylinder air charge is adjusted at 442, spark timing is adjusted at 444. Thus, the indicated torque produced by the engine is less than torque to rotate the engine at its base idle speed and less than torque to accelerate the engine from cranking speed to idle speed in a threshold amount of time. In one example, the spark timing adjustments or cylinder air charge adjustments at 444 are empirically determined based on a desired indicated engine torque and the spark or cylinder air charge values determined at 442. The spark timing adjustments may be retrieved from a table based on cylinder air charge and desired indicated engine torque. The cylinder air charge adjustments may be retrieved from a table based on spark timing and desired indicated engine torque. Method 400 proceeds to 446.

At 446, method 400 provides torque via the motor sufficient to accelerate the engine to its base idle speed and rotate the engine at a base engine idle speed. The motor may be operated in a speed control mode where a desired speed is followed by the motor while motor torque is allowed to vary. Alternatively, the motor may be operated in a torque control mode where motor torque follows a desired torque. Method 400 proceeds to exit.

Thus, the method of FIG. 4 provides for an engine operating method, comprising: combusting air and fuel within cylinders of an engine at an idle speed while providing engine torque insufficient to rotate the engine at the idle speed; and rotating the engine at the idle speed via torque produced by a motor in response to a request to heat a catalyst. The method further comprises adjusting an amount of air entering the engine responsive to a desired rate of catalyst heating. The method further comprises retarding spark timing to provide the engine torque less than is needed to rotate the engine at the idle speed. The method includes where the motor is a belt integrated starter/generator. The method includes where the motor is a driveline integrated starter/generator. The method includes where the idle speed is based on engine temperature. The method further comprises running up speed of the engine from zero speed to the idle speed via the motor while combusting air and fuel within the cylinders of the engine and providing engine torque less than is needed to run-up engine speed to the idle speed.

The method of FIG. 4 also provides for an engine operating method, comprising: supplying spark to cylinders of an engine at a timing advanced or retarded from minimum spark for best torque spark timing in response to a request for vacuum and a request for catalyst heating, the timing weighted based on a difference in desired vacuum and actual vacuum; combusting air and fuel within the cylinders of the while producing insufficient engine torque to rotate the engine at a desired idle speed; and rotating the engine at the desired idle speed via torque produced by a motor in response to the request to a request to heat the catalyst and the request for vacuum.

In some examples, the method further comprises weighting the timing based further on a difference in a catalyst light off temperature and actual catalyst temperature. The method includes where the timing is retarded away from minimum spark for best torque when the difference in desired vacuum and actual vacuum is decreasing. The method includes where the timing is advanced toward minimum spark for best torque spark timing when the difference in the desired catalyst temperature and actual catalyst temperature decreases. The method includes where the request to heat the catalyst and the request for vacuum are based on an engine start request. The method further comprising running up speed of the engine from zero speed to the idle speed via the motor while combusting air and fuel within the cylinders of the engine and providing engine torque less than is needed to run-up engine speed to the idle speed. The method further comprises reducing a load on an alternator in response to the difference in desired vacuum and actual vacuum.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine operating method, comprising:
generating a vacuum request;
generating a catalyst heating request; and
combusting air and fuel within a cylinder of an engine at a retarded spark timing, wherein the retarded spark timing is selected based on the generated vacuum request and the generated catalyst heating request, wherein combusting air and fuel at the retarded spark timing provides engine torque insufficient to rotate the engine at an idle speed, while rotating the engine at the idle speed via torque produced by a motor in response to the generated catalyst heating request.

2. The method of claim 1, the method further comprising selecting the retarded spark timing from a table based on a difference in desired vacuum and actual vacuum and further based on a difference between a catalyst temperature and a catalyst light off temperature, the method further comprising adjusting an amount of air entering the engine responsive to a desired rate of catalyst heating and further responsive to the generated vacuum request.

3. The method of claim 1, further comprising increasing the torque produced by the motor as the engine torque decreases.

4. The method of claim 1, where the engine torque is insufficient to rotate the engine at the idle speed, wherein the engine torque in concert with the torque produced by the motor is sufficient to rotate the engine at the idle speed.

5. The method of claim 1, where the motor is a driveline integrated starter/generator.

6. The method of claim 1, where the idle speed is based on engine temperature and further based on the vacuum request.

7. The method of claim 1, further comprising running up speed of the engine from zero speed to the idle speed via the motor while combusting air and fuel within the cylinder of the engine and providing engine torque less than is needed to run-up engine speed to the idle speed.

8. An engine operating method, comprising:
generating a vacuum request;
generating a catalyst heating request;
supplying spark to cylinders of an engine at a timing advanced or retarded from minimum spark for best torque spark timing, wherein the timing advanced or retarded from minimum spark for best torque spark timing is selected based on both the generated vacuum request and the generated catalyst heating request, the timing advanced or retarded from minimum spark for best torque spark timing adjusted based on a difference in desired vacuum and actual vacuum; and
combusting air and fuel within a cylinder of the engine at the timing advanced or retarded from minimum spark for best torque spark timing producing insufficient engine torque to rotate the engine at a desired idle speed while compensating for the insufficient engine torque with torque produced by a motor to rotate the engine at the desired idle speed in response to the generated vacuum request and the generated catalyst heating request.

9. The method of claim 8, further comprising weighting the timing based further on a difference in a catalyst light off temperature and an actual catalyst temperature.

10. The method of claim 9, where the timing is retarded away from minimum spark for best torque when the difference in desired vacuum and actual vacuum is decreasing.

11. The method of claim 10, where the timing is advanced toward minimum spark for best torque spark timing when the difference in the catalyst light off temperature and actual catalyst temperature decreases.

12. The method of claim 8, where the generated catalyst heating request and the generated vacuum request are based on an engine start request.

13. The method of claim 8, further comprising running up speed of the engine from zero speed to the desired idle speed via the motor while combusting air and fuel within the cylinder of the engine and providing engine torque less than is needed to run-up engine speed to the desired idle speed.

14. The method of claim 8, further comprising reducing a load on an alternator in response to the difference in desired vacuum and actual vacuum.

15. A system, comprising:
an engine;
a transmission coupled to the engine;
a motor/generator coupled to the engine via a belt; and
a vehicle system controller including executable instructions stored in non-transitory memory to generate a vacuum request and a catalyst heating request, rotate the engine at an idle speed via the motor/generator while the engine is combusting air and fuel in response to the generated vacuum request and the catalyst heating request, the engine producing torque that is insufficient to rotate the engine at the idle speed, wherein a torque of the motor/generator increases based on the generated catalyst heating request, wherein the idle speed is based on both the generated vacuum request and the catalyst heating request.

16. The system of claim 15, further comprising additional instructions to operate the engine at minimum spark timing for best torque while rotating the engine at the idle speed.

17. The system of claim 15, further comprising additional instructions to retard spark timing from minimum spark timing for best torque while rotating the engine at the idle speed while the engine is producing torque that is insufficient to rotate the engine at the idle speed in response to the generated catalyst heating request.

18. The system of claim 15, further comprising an ignition system and additional instructions to provide spark to the engine at minimum spark timing for best torque while the engine is producing torque that is insufficient to rotate the engine at the idle speed.

19. The system of claim 18, further comprising additional instructions to close a throttle of the engine in response to the generated vacuum request.

20. The system of claim 15, further comprising additional instructions to activate an aspirator in response to the generated vacuum request.

\* \* \* \* \*